Patented June 16, 1936

2,044,730

UNITED STATES PATENT OFFICE 2,044,730

PRODUCTION OF ARTIFICIAL MATERIALS

Erich Kuehn, Mannheim, and Heinrich Hopff, Ludwigshafen-on-the-Rhine, Germany, assignors to I. G. Farbenindustrie Aktiengesellschaft, Frankfort-on-the-Main, Germany No Drawing. Application April 17, 1933, Serial No. 666,544. In Germany May 14, 1932

8 Claims. (Cl. 260—2)

The present invention relates to the production of artificial materials from polymerized vinyl alcohol and aldehydes.

It is known in the art that different modifications of polymeric vinyl alcohol can be obtained owing to the different methods of the production of the polymeric alcohol which may be prepared for example by a more or less strong polymerization of vinyl acetate, or of vinyl chloracetate and subsequent saponification of the polymeric esters. The different modifications are generally equivalent as regards their chemical properties but differ somewhat from each other in their physical properties, such as solubility and viscosity of their solutions.

It has already been proposed to prepare artificial materials by reacting the different modifications of polymeric vinyl alcohol with aldehydes in the presence of accelerators. The initial materials may also be polymeric vinyl esters, the saponification of the polymeric vinyl esters to form the corresponding polymeric vinyl alcohols being carried out simultaneously with the condensation of the latter with aldehydes; in this condensation acetals are probably formed. By varying the amount of aldehyde employed, artificial materials having different properties may be prepared. Thus, for example, by employing very small amounts of acetaldehyde, products are obtained which are still soluble in water. By employing larger amounts of aldehyde, the solubility or capability of swelling in water of the product decreases until, when the ratio is 2 molecular proportions of a polymeric vinyl alcohol to 1 molecular proportion of acetaldehyde, the capacity of the condensation product for swelling in water is usually practically removed. Generally speaking, it is necessary to employ a quantity of aldehyde in excess of that desired to take part in the reaction; the removal of remainders of aldehyde is, however, difficult because, by reason of its great reactivity, it gives rise to resinification, the resulting resin only being capable of separation with very great difficulty. When employing aldehydes of high molecular weight, the removal of remainders of aldehyde from the reaction product is especially difficult because these aldehydes are usually only volatile with difficulty in steam and can frequently only be incompletely removed by other methods.

We have now found that very valuable artificial materials derived from the reaction of the different modifications of polymeric vinyl alcohol and aldehydes, in the presence of acid accelerators, can be obtained by carrying out the reaction in a substantially anhydrous, i. e. an anhydrous or practically anhydrous, medium, while removing the water formed during the reaction.

Aldehydes of any kind may be employed for the reaction, for example aliphatic aldehydes such as formaldehyde, acetaldehyde, propionaldehyde, butyraldehyde, dodecyladlehyde, octodecylaldehyde, crotonaldehyde, oleylaldehyde, or 2-ethylcapronic aldehyde, cyclic aldehydes, for example cycloaliphatic aldehydes, such as hexahydrobenzaldehyde, aromatic aldehydes, such as benzaldehyde, chlorobenzaldehyde, cinnamic aldehyde, or alpha- or beta-naphthaldehyde, and heterocyclic aldehydes such as furol.

The said acid accelerators comprise substantially anhydrous acids, such as sulphuric, phosphoric, chlorhydric, chloracetic, para-toluenesulphonic or methyl-sulphuric acids; these acids are non-oxidizing acids, in contrast to nitric, permanganic or chloric acids, which cannot be employed for the purpose intended. The said acid accelerators are usually employed in an amount between 0.1 per thousand and 10 per cent, preferably in an amount between 1 per thousand and 1 per cent by weight of the polyvinyl alcohol. If the said polyvinyl alcohol has been prepared by saponification of a polyvinyl ester by means of acid, it is not necessary to add one of the said acid accelerators to the reaction mixture because a sufficient amount of acid is usually retained in the saponified polyvinyl alcohol. If, however, the saponification of the ester has been carried out by means of alkali, the amount of acid accelerator must be sufficient to neutralize any alkali still present and, moreover, to give a slightly acid reaction to the alcohol.

The removal of the water formed may be effected by absorbing the water during the reaction by means of neutral substances having a strong water-absorbing action such as anhydrous calcium chloride, dehydrated sodium sulphate, anhydrous copper sulphate, anhydrous sodium acetate, dehydrated magnesium or calcuim sulphate and the like. It is especially advantageous, however, to carry out the reaction in the presence of an inert diluent which is insoluble in water, such as benzene, ethylene chloride, methylene chloride, chloroform, carbon tetrachloride, trichlorethylene, dichlorethylene, benzine fractions, cyclohexane, monochlorbenzene, dichlorbenzene, nitrobenzene or the like, the water formed being distilled off together with the diluent during the reaction. If, however, the reaction is carried out in the presence both of a diluent and of an inert water-absorbing substance, the working temperature may be below the boiling point of the diluent because in this case the water need not be removed by distillation. The diluent is usually employed in an amount equal to the weight of the reaction mixture up to 10 times said weight. After separating the water from the distillate the residual diluent may be returned to the reaction vessel whereby the process is rendered continuous. The amount of water separated gives an indication of how far the reaction has proceeded and when it is completed.

As a result of the removal of the water formed during the condensation it is possible to bring the aldehyde employed quantitatively into reaction. The employment of an excess of aldehyde and the consequent subsequent treatment of the reaction product for the removal of the unconverted aldehyde is therefore generally speaking dispensed with. By the said method it is also possible, inter alia, to prepare products in which only a part of the hydroxyl groups of the polymeric vinyl alcohol has entered into reaction with the aldehyde. While hitherto in order to obtain always uniform products, it has been absolutely necessary to adhere precisely and accurately to a specific method of working chosen (concentration, temperature and time) which has been calculated purely empirically, according to the present invention the amount of aldehyde entering into reaction may be most accurately controlled by determining the amount of water of reaction formed and it is possible thus to ascertain whether the desired product is already formed without the necessity for a careful maintenance of definite working conditions. Thus it is possible in all cases to obtain a specific desired reaction product without any difficulties. This is of special importance in the preparation of reaction products with the aid of more or less impure industrial mixtures containing aldehydes, such as for example crude, commercial butyraldehyde or mixtures of aldehydes containing from 8 to 14, mainly 12 carbon atoms, such as may be obtained by the catalytic dehydration of mixtures of alcohols prepared by catalytic hydrogenation of fatty oils and fats, such as coconut oil, sperm oil, rape seed oil, cotton oil and the like.

The process of the present invention allows inter alia of the production of new artificial materials, namely those from polyvinyl alcohol and those aliphatic aldehydes containing more than 4 carbon atoms in their molecule.

When carrying out the reaction with polymeric vinyl carboxylates, such as polymeric vinyl acetate, formate or butyrate, the reaction is carried out in the presence of monohydric alcohols of low boiling point such as methanol, ethanol, propanol or butanol. A re-esterification then first takes place as a result of which the esters of the added alcohols and the free polymeric vinyl alcohol are formed, the latter then reacting with the aldehydes with the splitting off of water. Also in this case the reaction is carried out, in accordance with the invention, in the presence of the said water-absorbing inert substances and/or of the aforesaid inert diluents.

The following examples will further illustrate the nature of this invention but the invention is not restricted to these examples. The parts are by weight.

*Example 1*

A mixture of 88 parts of polymeric vinyl alcohol, obtained by the saponification of polymerized vinyl acetate dissolved in ethyl alcohol by means of sulphuric acid, 300 parts of methylene chloride and 44 parts of acetaldehyde is gradually heated to boiling while stirring in a vessel provided with a descending condenser. A mixture passes over which contains methylene chloride, water and, at first, a little acetaldehyde; after condensation by cooling, the mixture is led for example into a U-tube or other vessel suitable for separating different layers of liquids. In this way the mixture separates into its components. The methylene chloride, together with the acetaldehyde dissolved therein, is separated from the aqueous layer and returned to the reaction vessel. As soon as 18 parts of water have passed over, the reaction is completed. The solution of the condensation product in methylene chloride is washed with water, the methylene chloride then being distilled off with steam. In this manner a solid white mass is obtained which may be employed for example as a substitute for celluloid for the preparation of films or lacquers.

*Example 2*

175 parts of polymeric vinyl acetate prepared by a polymerization with the aid of 1 per thousand of benzoyl peroxide at 72° C. are dissolved in a mixture of 250 parts of methylene chloride and 72 parts of butyraldehyde, a solution of 1 part of phosphoric acid in 200 parts of n-butyl alcohol being added. The reaction mixture is then heated to boiling while stirring in the apparatus described in Example 1 until about 18 parts of water have passed over. After washing with water, the solvents employed (methylene chloride and butyl alcohol) and the butyl acetate formed during the reaction are expelled with steam. The condensation product is a solid mass which dissolves in chlorinated aliphatic or aromatic hydrocarbons (such as methylene or ethylene chlorides and chlorbenzene), benzene and esters, such as ethyl or butyl acetates, and which may be employed as a substitute for celluloid for the preparation of films or lacquers.

*Example 3*

88 parts of polymeric vinyl alcohol obtained by the saponification of polymerized vinyl acetate, 300 parts of ethylene chloride, 184 parts of lauric aldehyde and 0.1 part of concentrated sulphuric acid are mixed and heated to boiling while stirring in the apparatus described in Example 1 until about 18 parts of water have passed over. The condensation product is worked up as in Example 1. The product obtained is a colourless mass which is plastic at room temperature and soluble in chlorinated aliphatic or aromatic hydrocarbons, benzene and benzine.

*Example 4*

88 parts of polymeric vinyl alcohol obtained by the saponification of polymerized vinyl acetate, are introduced while stirring into a mixture of 300 parts of methylene chloride, 36 parts of butyraldehyde, 92 parts of lauric aldehyde and 0.1 part of concentrated sulphuric acid, the mixture then being heated to boiling in the apparatus described in Example 1 until about 18 parts of water have passed over. The reaction product is worked up in the manner described in Example 1 and constitutes a colourless mass which is somewhat intermediate of those obtained according to Examples 2 and 3 as regards its properties.

Example 5

A mixture of 172 parts of polymeric vinyl acetate, 300 parts of anhydrous ethyl alcohol, 72 parts of butyraldehyde and 8 parts of concentrated sulphuric acid are heated to boiling while stirring under a reflux condenser after the addition of 100 parts of dehydrated sodium sulphate until the reaction mixture no longer shows the aldehyde reaction. After distilling off the solvent with steam and removing the sodium sulphate by washing with a little water, a product is obtained which is identical with that obtained according to Example 2 as regards its properties.

Example 6

88 parts of polymeric vinyl alcohol, prepared by the saponification of polymerized vinyl chloracetate, are suspended in a mixture of 200 parts of methylene chloride, 1.2 parts of butyraldehyde and 0.05 part of concentrated sulphuric acid in the apparatus described in Example 1 and the whole is heated to boiling while stirring until 0.3 part of water has been distilled off. The mixture is then allowed to cool and the reaction product is filtered off by suction. It is a white powder which still dissolves in water but the aqueous solutions of which have a considerably higher viscosity than aqueous solutions of the same concentration of polymeric vinyl alcohol.

Example 7

A mixture of 88 parts of polymeric vinyl alcohol, prepared by the saponification of polymeric vinyl acetate, 128 parts of 2-ethyl capronic aldehyde

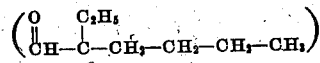

0.5 part of phosphoric acid of 85 per cent strength and 500 parts of chloroform are heated to boiling while stirring in the apparatus described in Example 1, until 18 parts of water have been distilled off. The mixture is then allowed to cool and the chloroformic solution is washed with water until the effluent water is neutral. The chloroform is then removed by distillation with steam. The resulting reaction product is a white powder which is soluble in chlorinated hydrocarbons such as methylene chloride, ethylene chloride or monochlorbenzene and in aromatic hydrocarbons such as benzene or toluene. The product may find useful application as an insulating material for electric devices.

What we claim is:—

1. The process for the production of artificial materials by condensing a polymeric vinyl alcohol with an aldehyde which comprises carrying out the condensation in a medium not miscible with water while removing the water formed during the reaction.

2. The process for the production of artificial materials by condensing a polymeric vinyl alcohol with an aliphatic aldehyde which comprises carrying out the condensation in a medium not miscible with water while removing the water formed during the reaction.

3. The process for the production of artificial materials by condensing a polymeric vinyl alcohol with an aliphatic aldehyde which comprises carrying out the condensation in a medium not miscible with water while absorbing the water, during the reaction, by means of a neutral substance having a strong water absorbing action.

4. The process for the production of artificial materials by condensing a polymeric vinyl alcohol with an aliphatic aldehyde which comprises carrying out the condensation in a water-insoluble inert diluent, the water formed being distilled off together with said diluent during the reaction.

5. The process for the production of artificial materials by condensing a polymeric vinyl alcohol with an aliphatic aldehyde which comprises carrying out the condensation in a water-insoluble inert diluent, the water formed being continuously distilled off together with said diluent, during the reaction and separated from the distillate, the residual, substantially anhydrous diluent being returned to the reaction.

6. The process for the production of artificial materials by condensing a polymeric vinyl alcohol with an aldehyde which comprises carrying out the condensation with a polymeric vinyl carboxylate and an aldehyde in a medium not miscible with water and in the presence of a monohydric aliphatic alcohol while removing the water formed during the reaction.

7. The process for the production of artificial materials by condensing a polymeric vinyl alcohol with an aliphatic aldehyde containing more than 4 carbon atoms which comprises carrying out the condensation in a water-insoluble inert diluent, the water formed being continuously distilled off together with said diluent during the reaction and separated from the distillate, the residual, substantially anhydrous diluent being returned to the reaction.

8. A condensation product from a polymeric vinyl alcohol and 2-ethyl capronic aldehyde.

ERICH KUEHN.
HEINRICH HOPFF.